(12) United States Patent
Geiger et al.

(10) Patent No.: US 7,753,320 B2
(45) Date of Patent: Jul. 13, 2010

(54) FLUSH MOUNT CONNECTOR CLIP

(75) Inventors: Gerard G. Geiger, Jackson, WI (US); Scott J. Adams, Menomonee Falls, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 394 days.

(21) Appl. No.: 11/580,363

(22) Filed: Oct. 13, 2006

(65) Prior Publication Data
US 2007/0102594 A1 May 10, 2007

Related U.S. Application Data

(63) Continuation-in-part of application No. 11/191,654, filed on Jul. 28, 2005, now abandoned.

(60) Provisional application No. 60/726,751, filed on Oct. 14, 2005.

(51) Int. Cl.
*F16L 3/00* (2006.01)

(52) U.S. Cl. .......................... 248/71; 248/68.1; 248/73; 248/74.5

(58) Field of Classification Search .................. 248/68, 248/71, 73, 74.5
See application file for complete search history.

(56) References Cited

U.S. PATENT DOCUMENTS

| | | | |
|---|---|---|---|
| 3,252,677 A * | 5/1966 | Raymond | ................ 248/68.1 |
| 4,427,328 A * | 1/1984 | Kojima | ................ 411/508 |
| 4,766,651 A | 8/1988 | Kobayashi et al. | |
| 4,875,647 A | 10/1989 | Takagi et al. | |
| 4,919,373 A | 4/1990 | Caveney et al. | |
| 4,944,475 A | 7/1990 | Ono et al. | |
| 4,993,669 A | 2/1991 | Dyer | |
| 5,102,075 A | 4/1992 | Dyer | |
| 5,131,613 A | 7/1992 | Kamiya et al. | |
| 5,333,822 A | 8/1994 | Benoit et al. | |
| 5,368,261 A * | 11/1994 | Caveney et al. | ................ 248/73 |
| 5,385,321 A | 1/1995 | Kume et al. | |
| D372,665 S | 8/1996 | Kim | |
| 5,601,261 A | 2/1997 | Koike | |
| 5,704,573 A * | 1/1998 | de Beers et al. | ................ 248/73 |
| 5,732,446 A | 3/1998 | Blanks | |
| 5,765,787 A * | 6/1998 | de Beers et al. | ................ 248/73 |
| 5,774,944 A | 7/1998 | Choi | |
| 5,820,083 A | 10/1998 | Geiger | |

(Continued)

FOREIGN PATENT DOCUMENTS

EP 943240 10/1961

*Primary Examiner*—J. Allen Shriver, II
*Assistant Examiner*—Steven M Marsh
(74) *Attorney, Agent, or Firm*—Ryan Kromholz & Manion, S.C.

(57) ABSTRACT

Disclosed is an improved mounting assembly for securely supporting elongated items against a surface. The assembly includes a device to attach at least one elongate object to the mount, a spring section, and a mount section. The mount section is in the form of a rectangular fir tree mount. The rectangular fir tree mount has a tapered tip and a generally rectangular shape. The center segment of the rectangular fir tree mount includes a number of curved branches. The spring section includes flexible springs extending downwardly from the mount. The flexible springs provide tension and resistance when the mount is inserted into a supporting surface. The flexible springs and the branches allow the rectangular fir tree mount to be utilized on panels of varying thicknesses.

3 Claims, 4 Drawing Sheets

U.S. PATENT DOCUMENTS

| | | |
|---|---|---|
| 5,890,265 A | 4/1999 | Christian et al. |
| 5,921,510 A | 7/1999 | Benoit et al. |
| 5,926,921 A | 7/1999 | Benoit |
| 5,966,781 A | 10/1999 | Geiger |
| D417,142 S | 11/1999 | Kim |
| D417,387 S | 12/1999 | Kim |
| D417,838 S | 12/1999 | Kim |
| 6,003,208 A | 12/1999 | Christian et al. |
| 6,105,908 A | 8/2000 | Kraus |
| 6,240,602 B1 | 6/2001 | Geiger |
| 6,253,421 B1 | 7/2001 | Kraus |
| 6,320,134 B1 | 11/2001 | Rehberg et al. |
| 6,550,723 B2 | 4/2003 | Fraley, II et al. |
| 6,560,822 B2 | 5/2003 | Caveney et al. |
| 6,655,644 B1 | 12/2003 | Gretz |
| 6,669,150 B2 * | 12/2003 | Benoit et al. ............... 248/74.2 |
| 6,718,597 B2 | 4/2004 | Geiger |
| 6,719,513 B1 * | 4/2004 | Moutousis et al. .......... 411/510 |
| 6,745,439 B2 | 6/2004 | Brownlee et al. |
| 6,749,157 B2 | 6/2004 | Takeuchi |
| 6,807,714 B2 | 10/2004 | O'Young et al. |
| 7,055,783 B2 | 6/2006 | Rosemann et al. |
| 7,114,686 B2 | 10/2006 | Andrigo |
| 7,114,687 B2 | 10/2006 | Swantner et al. |

* cited by examiner

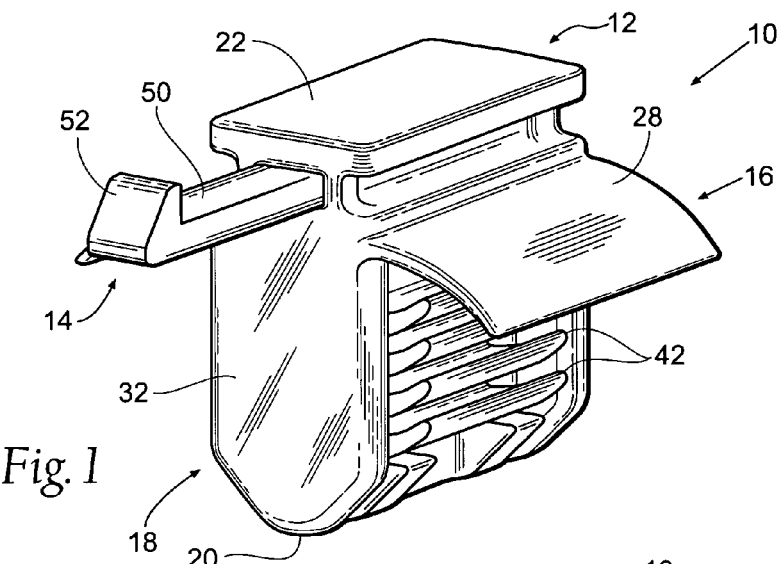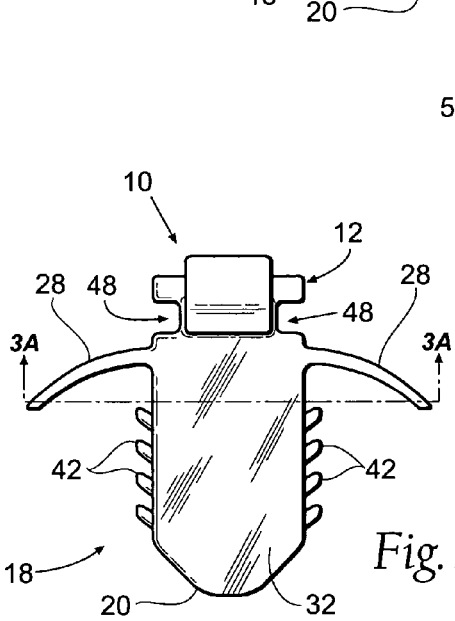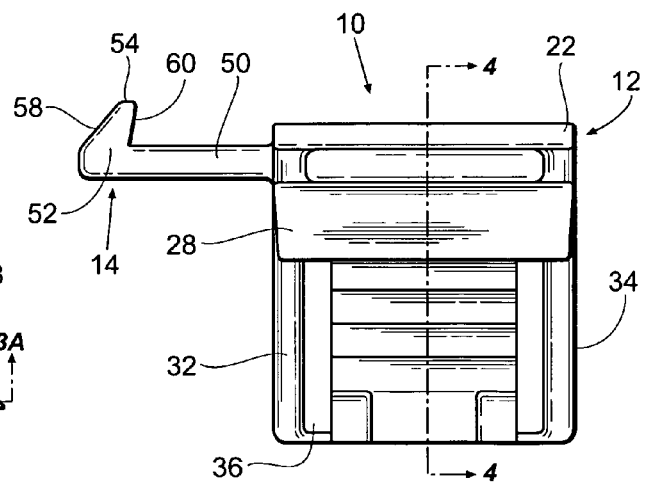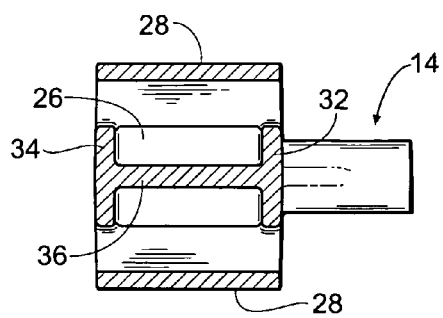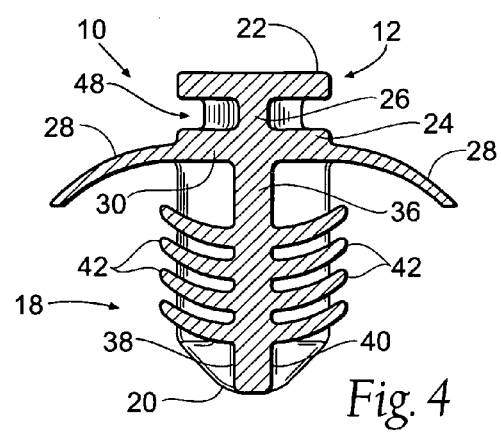

FLUSH MOUNT CONNECTOR CLIP

RELATED APPLICATIONS

This is a continuation-in-part of U.S. patent application Ser. No. 11/191,654, filed 28 Jul. 2005 now abandoned, and also claims the benefit of co-pending U.S. Provisional Patent Application Ser. No. 60/726,751, filed 14 Oct. 2005.

BACKGROUND OF THE INVENTION

This invention relates generally to hardware for securing bundled elongate articles, such as wires, cables, hoses, tubing, fiber optics, conduits, vines, etc., to a supporting structure. More particularly, the invention relates to a mounting element for securing elongated articles, extending from the hardware and into the supporting structure or its facing surface.

In many applications, it is sufficient merely to secure the items into a bundle. Such applications might include, for example, stationary electronic equipment that remains in one place and is subject to little or no vibration in use. In other applications, it is necessary or desirable not only to secure the items into a bundle, but to secure the resulting bundle to a supporting chassis or framework as well. Such applications are also common, for example, in cars, trucks, airplanes, ships, boats and other vehicles where the bundle is likely to be subjected to severe jostling and vibration. In other applications (e.g. buildings), where vibration might not be an important consideration, it is still desirable to secure cables, hoses, tubes, etc., to a fixed structure.

Specifically, automobiles manufactured today feature numerous electronic components provided for the safety, comfort, and convenience of passengers. Many of these features are located in or near the seat of the automobile. For example, automatic seat position controls, seat heaters, and safety sensors such as seatbelt engagement sensors and weight sensors for engagement of an airbag system. However, the motor controls for these components may be located away from the seat, closer to the motor of the automobile. This results in numerous wires running between the components on a vehicle. Generally, these wires are attached with a wire connector or plastic fitting which is then left to dangle at various locations. However, a dangling wire connector is free to move about and may cause problems such as noise or electronic circuitry failure due to wire abrasion or wire fatigue. Therefore, it would be desirable to have a wire connector which could be set in a fixed position.

Many mounts do not provide an efficient, tight grip when applied to a support surface. Previous Christmas tree or fir tree mounts, such as U.S. Pat. No. 5,921,510, issued to Benoit et al., contemplates strengthened mounting studs, but still leaves room for improvement. Such mounts may not provide sufficient resistance and tightness against the support surface for adequately supporting a bundled item. Likewise, such mounts may utilize a longer than necessary mounting stud and may not be easily inserted into the support surface. Additionally, many mounts do not provide for anti-rotation rotation when applied to a support surface, or require more than one mounting shaft to prevent rotation. The present invention provides for an improved mounting assembly to address these problems.

SUMMARY OF THE INVENTION

The present invention provides an improved rectangular fir tree mount assembly for securely supporting bundled items against a supporting surface. The assembly provides a rectangular fir tree mount which can be securely and nonrotatably attached to a supporting surface. Branches extend from either side of a center segment of the mounting section. The branches flex to pass through an aperture in the supporting surface, then spring back to engage the backside of the supporting surface to retain the rectangular fir tree mount in the rectangular aperture.

The invention may also include a pair of flexible springs which engage the supporting surface to provide tension and resistance when the mounting stud is inserted into the supporting surface. The invention may also include an attachment section and a snap hook to attach the rectangular fir tree mount to a wire connector. The invention may also include a clip or clamp to connect at least one wire or other elongate object to the rectangular fir tree mount. The invention may also include a saddle to connect a cable tie, optionally secured around a bundle of objects, to the rectangular fir tree mount. A rectangular fir tree mount assembly according to the present invention may include any combination of the above features.

BRIEF DESCRIPTION OF THE DRAWINGS

FIG. 1 is a perspective view of the rectangular fir tree mount of the present invention.

FIG. 2 is a side view of the rectangular fir tree mount of the present invention.

FIG. 3 is a front view of the rectangular fir tree mount of the present invention.

FIG. 3A is a cross sectional view of the rectangular fir tree mount of FIG. 3, taken along the line 3A-3A in FIG. 3.

FIG. 4 is a cross sectional view of the rectangular fir tree mount of FIG. 2, taken along the line 4-4 in FIG. 2.

DESCRIPTION OF THE PREFERRED EMBODIMENT

Figure 5:
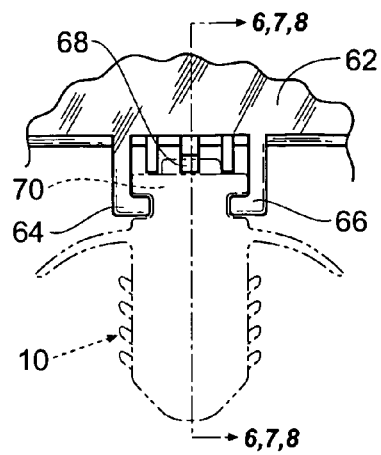
FIG. 5 is a front end view of the wire connector of the present invention with the rectangular fir tree mount of the present invention shown in phantom.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

FIGS. 1-4 show a rectangular fir tree mount 10 according to the present invention. The rectangular fir tree mount 10 of the preferred embodiment comprises an attachment section 12, a latch section 14, a spring section 16, and a mounting section 18 ending in a tapered leading tip 20. The attachment section 12 has a generally I-shaped cross section. The horizontal I-shaped section is made of a mounting plate 22, a bottom segment 24, and a cross segment 26.

The spring section 16 extends from the bottom segment 24. The spring section 16 is comprised of a pair of springs 28 attached to a rectangular center spring section 30. The center spring section 30 is parallel to and extends from the bottom segment 24. Each spring 28 has a generally rectangular shape. However, as can best be seen in FIGS. 3 and 4, the springs 28 curve slightly toward the tapered leading tip 20 of the rectangular fir tree mount 10. The flexible springs 28 are also tapered at the free end thereof, to increase the range of flexibility of the springs 28.

Extending beneath the flexible springs 28 is the mounting section 18. The mounting section 18 can be best seen in FIGS. 1, 3, and 4. The mounting section 18 consists of a front end segment 32, a back end segment 34, and a center segment 36 which forms a vertical I-shaped section. The front end segment 32, back end segment 34, and center segment 36 each extends from the center spring section 30. FIG. 3A is a cross section cut through line 3A-3A of FIG. 3. FIG. 3A shows the I-shape of the front end, back end, and center segment 32,34, 36. The center segment 36 extends between the front end segment 32 and the back end segment 34 such that the plane of the center segment 36 is generally perpendicular to the plane of the front end segment 32 and the back end segment 34. The center segment 36 has a first surface 38 and a second surface 40 with a plurality of branches 42 formed on each of said surfaces 38,40. As can be seen in FIG. 4, the branches 42 curve toward the attachment segment 12, and each branch 42 is tapered at its free end. As is best seen in FIG. 3, the front end segment 32 and the back end segment 34 are tapered to form a tapered leading tip 20. The leading tip 20 is tapered so as to aid in insertion of the fastener 10 in a mounting aperture 44 in a supporting panel 46.

As can be seen best in FIG. 1, the front end segment 32 extends beyond the mounting section 18 to meet the mounting plate 22. Similarly, the back end segment 34 extends beyond the mounting section 18 to meet the mounting plate 22. The front end segment 32 and the back end segment 34 have a notch 48 on either side of the segment 32,34 which corresponds to the area between the mounting plate 22 and the bottom segment 24. As can be seen in FIG. 4, these notches 48 corresponds generally to the center segment 36, however, the center segment 36 is narrower than the notches 48.

Referring again to FIGS. 1-4, the snap section 14 extends from the front end segment 32. The snap section 14 comprises a snap beam 50 and a snap hook 52. The snap beam 50 is a flexible generally rectangular arm which extends perpendicularly from the front end segment 32 at generally the same location as the notches 48. A snap hook 52 is formed at the free end of the snap beam 50. The snap hook 52 extends from the top surface of the snap beam 50. In the preferred embodiment, the top surface 54 is generally parallel to the snap beam 50. As is best seen in FIG. 2, the leading surface 58 of the snap hook 52 slopes from the tip of the snap beam 50 back towards the attachment section 12. The trailing surface 60 is also sloped to provide increased retention, although the trailing surface 60 is closer to perpendicular to the snap beam 50 than the leading surface 58.

The rectangular fir tree mount 10 is designed to be easily attached to a wire connector 62. To achieve this, the wire connector 62 is formed with a plurality of raised segments. The connector has at least two angle segments and a raised segment. The first angle segment 64 and the second angle segment 66 are each formed as a right angle. The first angle segment 64 and the second angle segment 66 each have a portion which extends perpendicularly from the connector 62 and a portion which is horizontal to the connector 62. The first angle segment 64 and the second angle segment 66 are oriented such that the two segments 64,66 form a slot 70 into which the rectangular fir tree mount 10 attachment section 12 can slide.

Figure 6:
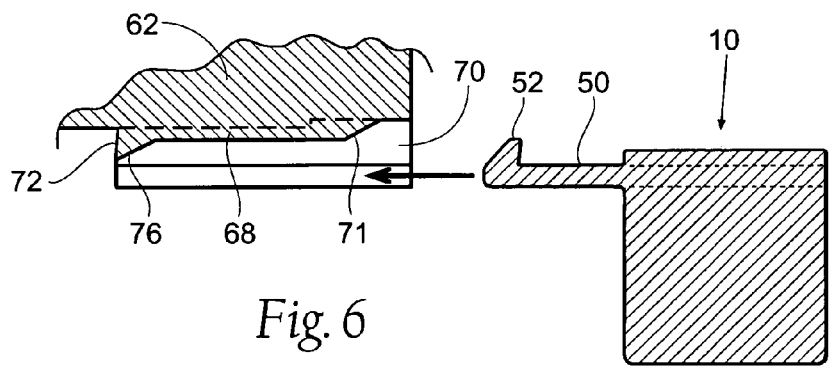
FIG. 6 is a simplified cross sectional view of the rectangular fir tree mount of FIG. 3 lined up for connection with the wire connector of the present invention.
Figure 7:
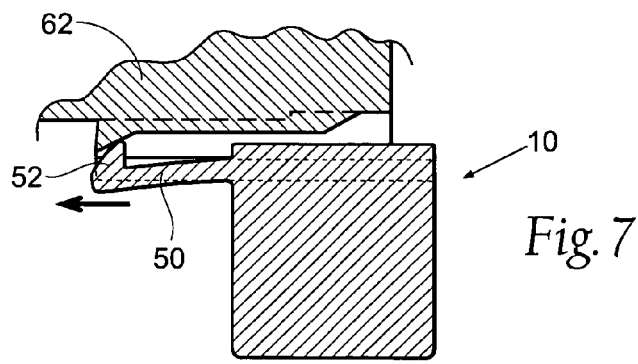
FIG. 7 is a simplified cross sectional view of the rectangular fir tree mount of FIG. 3 being partially connected to the wire connector of the present invention.
Figure 8:
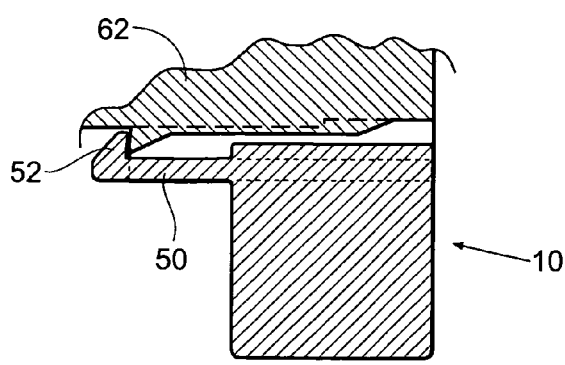
FIG. 8 is a simplified cross sectional view of the rectangular fir tree mount of FIG. 3 in its final connected position with the wire connector of the present invention.

The raised segment 68 is best shown in FIGS. 6-8. The raised segment 68 is generally rectangular. The raised segment 68 has a leading end 71 and an abutment face 72. The leading end 71 is formed as a first ramped portion that extends from the surface of the connector 62 to the surface of the raised segment 68. At the trailing end 73 the raised segment 68 has a second ramped surface 76. The raised segment 68 ends in an abutment face 72 which is somewhat perpendicular to the connector 62.

As is shown in FIGS. 6-8, the rectangular fir tree mount 10 can be attached to the wire connector 62 aligning the rectangular fir tree mount 10 with the slot 70 on the wire connector 62. The rectangular fir tree mount 10 is then slid into the slot 70. The horizontal portion of the first angle segment 64 and the second angle segment 66 engage the groove formed on the attachment section 12 of the rectangular fir tree mount 10. The top surface 54 of the snap hook 52 slides along the surface of the raised segment 68. When the snap hook 52 reaches the trailing end 73 of the raised segment 68, the leading surface 58 of the snap hook 52 engages the second ramped surface 76 of the raised segment 68. The second ramped surface 76 acts as a cam surface, so that as the rectangular fir tree mount 10 is slid further into the slot 70 the snap hook 52 continues to slide along the second ramped surface 76 and the snap beam 50 is caused to flex as shown in FIG. 7. As the snap hook 52 passes the end of the second ramped surface 76, the snap beam 50 springs back to its original unflexed position. The rectangular fir tree mount 10 cannot be slid out of the slot 70 in the wire connector 62 because of the engagement of the trailing surface 60 of the snap hook 52 with the abutment end 72 of the raised segment 68. The wire connector 62 and the rectangular fir tree mount 10 are thereby interlocked. However, to disengage the rectangular fir tree mount 10 from the wire connector 62, the snap hook 52 can be manually lifted out of engagement with the abutment end 72 and the rectangular fir tree mount 10 can be slid from the slot 70 in the wire connector 62.

Figure 9:
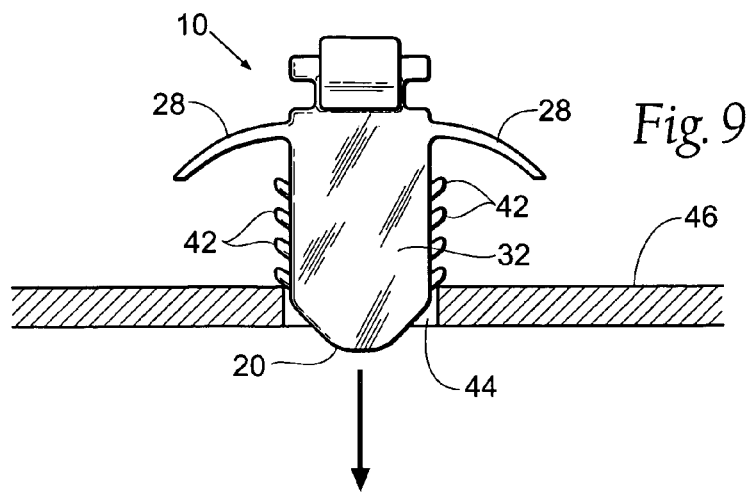
FIG. 9 is a side view of the rectangular fir tree mount of the present invention lined up to be inserted into an aperture in a panel.
Figure 10:
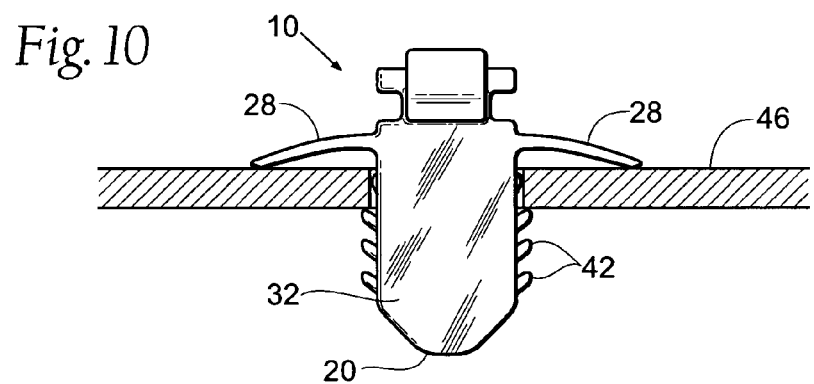
FIG. 10 is a perspective view of the rectangular fir tree mount of the present invention inserted into an aperture in a panel.

FIGS. 9 and 10 show how the rectangular fir tree mount 10 of the present invention is inserted into a mounting aperture 44 in a supporting panel 46. The mount 10 is shown without the wire connector 62 being attached to aid in the clarity of the figures. However, it should be understood that the rectangular fir tree mount 10 can be inserted into a mounting aperture 44 with or without the wire connector 62 attached to the rectangular fir tree mount 10. The tapered leading tip 20 of the rectangular fir tree mount 10 is lined up with the mounting aperture 44 in the panel 46 as seen in FIG. 9. The leading tip 20 is inserted into the mounting aperture 44. When the rectangular fir tree mount 10 is pushed further into the aperture 44, the branches 42 flex and are wedged into the inner surface of the aperture 44. The branches 42 then spring back to their original configuration after they exit the mounting aperture 44 on the opposite side of the panel 46.

When the rectangular fir tree mount 10 is securely inserted into a mounting aperture 44, the free end of a set of branches 42 will engage the backside of the panel 46. The ends of the flexible springs 28 engage the supporting panel 46 when the rectangular fir tree mount 10 is completely inserted into a mounting aperture 44 in the panel 46. The flexible springs 28 apply a preload pressure to the top of the supporting surface 46 which stabilizes the rectangular fir tree mount 10 and the attached wire harness 62. The rectangular fir tree mount 10 is securely retained in the aperture 44 by the ends of the branches 42 engaging the backside of the panel 46, and the flexible springs 28 engaging the opposite side of the panel 46.

The flexibility of the springs 28 allows them to be utilized on a variety of panel 46 thicknesses. The force applied by the springs 28 prevents the rectangular fir tree mount 10 and attached wire harness 62 from being wobbly on varying panel thicknesses. The plurality of branches 42 on the rectangular fir tree mount 10 also allows for variety of panel thicknesses to be accommodated. Further, the ends of the front end segment 32 and the back end segment 34 each make contact with the corners of the rectangular mounting aperture to provide anti-rotation.

The use of a rectangular fir tree mount 10 has several advantages over other possible means of securing a connector. The rectangular fir tree mount 10 has a low insertion force which is below 18 lbs. The rectangular fir tree mount 10 has a high retention force which is above 60 lbs. Only a single rectangular mounting hole 44 is required to achieve anti-rotation of the device. An alternate configuration would require at least two holes to achieve anti-rotation. The single mounting hole 44 requires less space than a two hole configuration. The single rectangular fir tree mount 10 is easier to align and push in to the rectangular mounting hole 44 than an alternate configuration which would require at least two mounting holes and mounting retainers or fasteners.

It is clear that the present invention could be manufactured by various methods, and of various materials. Preferably the components for the mounting device are injection molded from a strong, durable plastic, such as Nylon 6/6.

Although the preferred application is for use in an automobile, it should be understood that the invention could also be utilized in many different devices including, but not limited to other vehicles such as airplanes, boats, and trucks, computer equipment, consumer electronics devices, communication devices, and medical instruments and devices. The invention can generally be applied to any application where a bundle of elongate articles are desired to be secured/to a rigid apparatus. Additionally, although the preferred embodiment described a wire connector 62, the rectangular fir tree mount 10 could be attached to any type of device which could be formed with the raised segments 64,66,68 described above.

Figure 11:
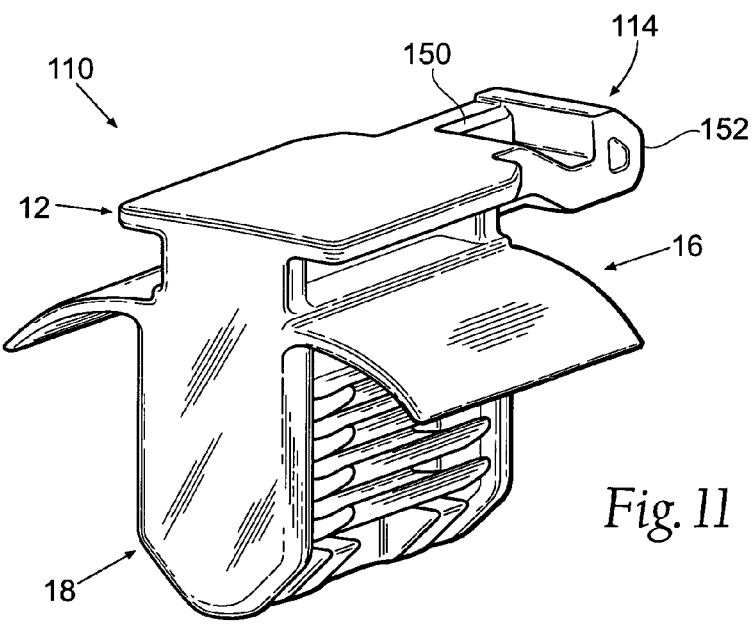
FIGS. 11-15 depict different embodiments of a rectangular fir tree mount of the present invention.

An alternate embodiment of the rectangular fir tree mount 110 is shown in FIG. 11. The embodiment shown in FIG. 11 is similar to the preferred embodiment, however the latch section 114 has a slightly different configuration. The latch section 114 includes a snap beam 150 which extends generally perpendicularly from the front end segment 32 at generally the same location as the notches 48. The snap beam 150 is a flexible arm which is formed with a ramped angle portion. A snap hook 152 is formed at the free end of the snap beam 150. The snap hook 152 is similar to the snap hook of the preferred embodiment. The effect of the ramped angle portion of the snap beam 150 is that the snap hook 152 does not extend beyond the mounting plate 22 of the attachment section 12. Additionally, the snap beam 150 is more rigid and will not deflect as easily. This provides higher retention forces with only slightly higher insertion forces.

Figure 12:
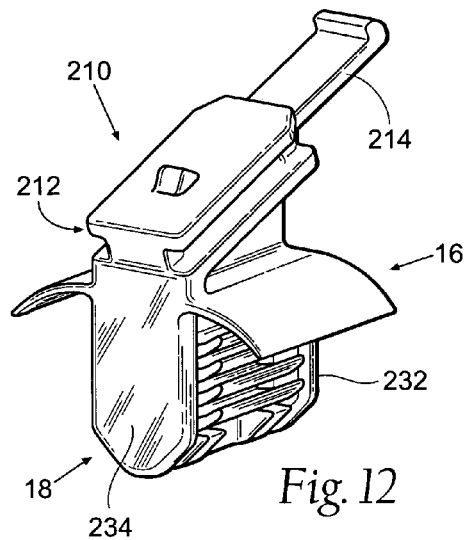

An alternate embodiment of the rectangular fir tree mount 210 is shown in FIG. 12. The embodiment shown in FIG. 12 is similar to the preferred embodiment; however the attachment section 212 and the snap section 214 are formed at an angle relative to the flexible spring portion 16. The mounted wire connector 62 runs parallel to the attachment section 212 and at an angle to the mounting panel 46.

Figure 13:
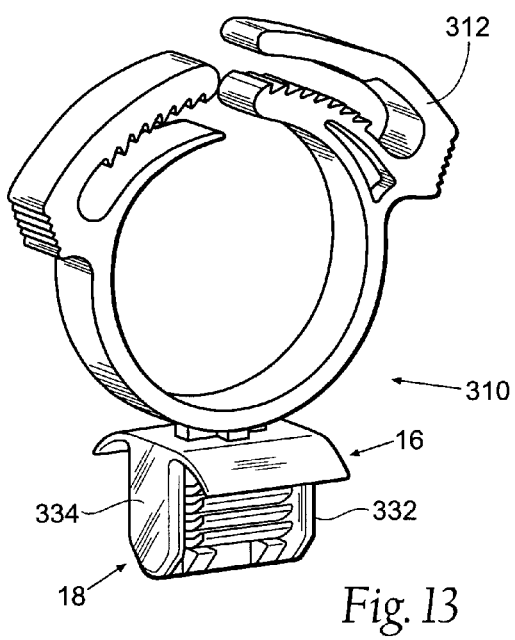
Figure 14:
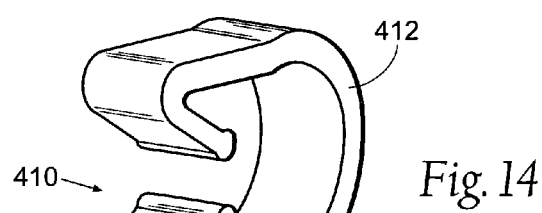
Figure 15:
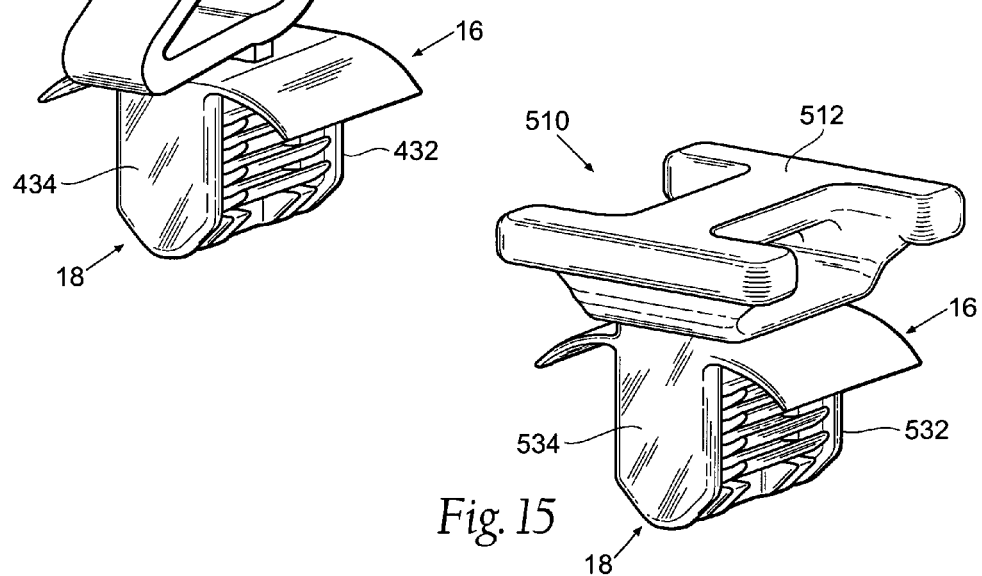

FIGS. 13-15 are examples of the features of the present invention used in different embodiments. The embodiments of FIGS. 13-15 employ the spring section and mount section as described above. The embodiments of FIGS. 13-15 are not adapted to be attached to a wire connector; rather these embodiments are designed to attach to a bundle of at least one elongate item. Therefore, the embodiments of FIGS. 13-15 do not include the attachment section and the latch section described above. Each of the embodiments of FIGS. 13-15 utilizes a different type of device to attach the at least one elongate item to the rectangular fir tree mount. The additional embodiments of the rectangular fir tree mount are attached to a panel as described above with respect to the preferred embodiment.

The front end segment 332,432,532 and back end segment 334,434,534 of mount in the embodiments shown in FIGS. 13-15 has a slightly different configuration than that of the preferred embodiment. The embodiments of FIGS. 13-15 do not include the attachment section. Therefore, the front end segment 332,432,532 and the back end segment 334,434,534 extend along the length of the mounting section 18 to meet the flexible springs 28, rather than meeting the mounting plate of the attachment section. The front end segment 332,432,532 and back end segment 334,434,534 also form the vertical "I" beam structure of the rectangular fir tree mount. It should also be clear that because the front end segment 332,432,532 and back end segment 334,434,534 do not extend beyond the flexible springs 28, there is no notched section in the front end segment 332,432,532 or the back end segment 334,434,534.

FIG. 13 shows a rectangular fir tree mount 310 of the present invention employing the spring section 16 and mounting section 18 as described above. The attachment section and the latch section have been replaced by a clamp 312. The clamp 312 extends from the center spring section 30, not shown. The clamp 312 may be tightened around a single item of various diameters, including a single item of a larger diameter or a bundle of items with smaller diameters.

FIG. 14 shows a rectangular fir tree mount 410 of the present invention employing the spring section and mount section as described above. In the present embodiment the attachment section and the latch section have been replaced by a clip 412. The clip 412 extends from the center spring section 30, and is adapted to be clipped around an elongate item such as a wire, cable, hose, tubing, harness, etc.

FIG. 15 shows a rectangular fir tree mount 510 of the present invention employing the spring section and mount section as described above. In the present embodiment the attachment section and the latch section have been replaced by a saddle mount 512. The saddle mount 512 extends from the center spring section 30 and has notches cut into the top surface there of. A slot shaped passage is formed in line with the notches and forms a rectangular through-hole to allow cable ties to pass therethrough. The notches are adapted to have a cable tie passed therethrough to attach a bundle of items to the rectangular fir tree mount 510.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A mounting assembly for anchoring at least one elongate member to a rectangularly apertured support structure, said mounting assembly interacting with a wire connector for engaging said elongate member, said mounting assembly comprising:
   an integrally formed mounting element having an attachment section and a bottom segment, said attachment section including:
   an integrally formed, rectangular mounting plate having an exposed surface including parallel, oppositely facing, longitudinally extending, notched cross segments slidably engageable with and supported by oppositely disposed, parallel, slot-forming, perpendicular wall segments extending from said wire connector,
   an integrally formed front end segment, and
   said notched cross segments extending between said mounting plate and said integrally formed bottom segment;
   a mounting section laterally extending from and lying parallel with said bottom segment and arranged to slidably engage the rectangular aperture formed in the support structure;
   anchoring means including a laterally extending snap member having an integral snap hook at its distal end engageable with an abutment face formed at the leading end of at least one of said perpendicular wall segments; and
   an integrally formed central spring section lying parallel with and laterally extending from said bottom segment, said central spring section including, integrally formed, reverse bowed, oppositely extending, spring members, each of said spring members being biased towards engagement with said support structure.

2. The mounting assembly of claim 1 including an integrally formed, longitudinally extending center section, and wherein said center section includes a plurality of oppositely disposed, laterally extending branches, and further wherein each of said branches curve towards its respective attachment end and each branch being respectively tapered at its free end to aid in insertion of the free end of the assembly in the aperture of the supporting structure.

3. The mounting assembly of claim 1
   wherein the anchoring means is formed with at least two longitudinally extending, raised, parallel, angle segments and at least one raised longitudinally extending supporting segment positioned in parallel alignment with and between said angle segments, and said supporting element forming a downwardly extending abutment face at its leading end, each angle segment including an inwardly facing, perpendicular, marginal edge portion, said facing angle segments arranged to slidably support said mounting plate, and wherein said raised supporting segment is of generally rectangular cross-section extending inwardly from its leading end, said leading end including a hook-engageable abutment face, said snap hook being downwardly ramped rearwardly toward its proximal end to provide a latching surface for snap anchorage of said snap hook and said abutment face.

* * * * *